Sept. 10, 1935. A. E. HAGUE ET AL Re. 19,695

TELEPHONE SYSTEM

Original Filed July 1, 1932 3 Sheets-Sheet 1

INVENTORS: A. E. HAGUE
J. B. DRAPER

BY [illegible]

ATTORNEY

Sept. 10, 1935. A. E. HAGUE ET AL Re. 19,695

TELEPHONE SYSTEM

Original Filed July 1, 1932 3 Sheets-Sheet 2

INVENTORS: A.E. HAGUE
J.B. DRAPER

BY M. P. McKenney

ATTORNEY

TELEPHONE SYSTEM

Original Filed July 1, 1932 3 Sheets-Sheet 3

INVENTORS: A.E. HAGUE
J.B. DRAPER

BY M. J. McTerney

ATTORNEY

Reissued Sept. 10, 1935

Re. 19,695

UNITED STATES PATENT OFFICE 19,695

TELEPHONE SYSTEM

Alfred E. Hague, West Orange, N. J., and John B. Draper, Brooklyn, N. Y., assignors, by mesne assignments, to Western Electric Company, Incorporated, a corporation of New York Original No. 1,941,085, dated December 26, 1933, Serial No. 620,408, July 1, 1932. Application for reissue June 12, 1935, Serial No. 26,204

10 Claims. (Cl. 179—18)

Figure 1:
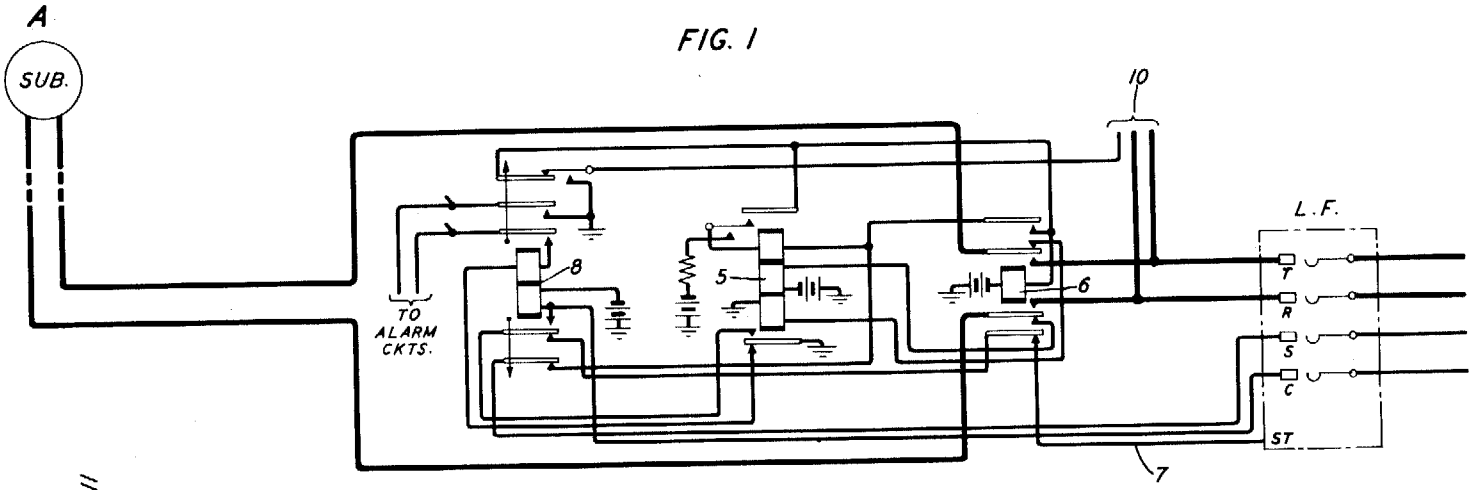

This invention relates to telephone systems and particularly to improvements in automatic telephone systems.

An object of this invention is to increase the utility of the switching facilities in automatic telephone systems.

Heretofore, in establishing a connection between two subscribers by means of automatic switches, when the calling subscriber has failed to actuate said switches either by failing to dial within a certain time after the seizing of the switches or has failed to complete the desired connection by failure to dial the complete number, a signal has been actuated at an operator's position to permit this operator to clear the connection either by communicating with the calling subscriber or releasing the switches used in the attempt to establish the connection.

Arrangements have also been provided in which the timing device is connected up to a set of switches seized by a calling subscriber removing his receiver from the switchhook and begins to function so that if the subscriber fails to dial said timing device causes the said seizure of a set of switches to become ineffective and causes the release of a relay which thereby prevents the calling subscriber from seizing another set of switches for dialing as long as his receiver remains off the switchhook.

Other arrangements have been provided in which the timing device is connected up to a set of switches seized, but does not begin to function until some time after said seizure. The arrangement is such that if the subscriber fails to dial within a certain interval after the timing device has started to function a relay is operated to release the seized set of switches and to prevent the calling subscriber from seizing another set of switches for dialing so long as the receiver remains off the switchhook.

It is a feature of the present invention to release the automatic switches seized by the calling subscriber when he removes his receiver off the switchhook preliminary to the dialing of the wanted subscriber's number, if the calling subscriber fails to dial within a certain time after the seizure of the switches or if the subscriber fails to dial the complete number.

It is a feature of the present invention to provide in systems of this kind, a timing device which is connected up to a set of switches seized by a calling subscriber and begins to function immediately so that if the subscriber fails to dial or dialing is not completed within a certain interval, a relay is operated in the line circuit of the calling subscriber to release said set of switches and prevent the calling subscriber from seizing another set of switches for dialing until after he has replaced the receiver on the switchhook.

Another feature is a timing device common to a plurality of switches for controlling the release of seized switches.

Another feature of this invention is a circuit arrangement whereby if the calling subscriber has hung up his receiver after the completion of a conversation with a called subscriber all of the switches used in the connection are released and if the called subscriber still has his receiver off the switchhook his line will then immediately seize a set of switches, but these switches are released a certain time interval thereafter provided the called subscriber takes no further action within this interval towards the establishing of a new connection and the called subscriber is thereafter prevented from extending a connection or reseizing switches until his receiver is replaced on the switchhook.

Figure 4:
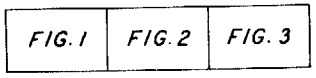
Figure 2:
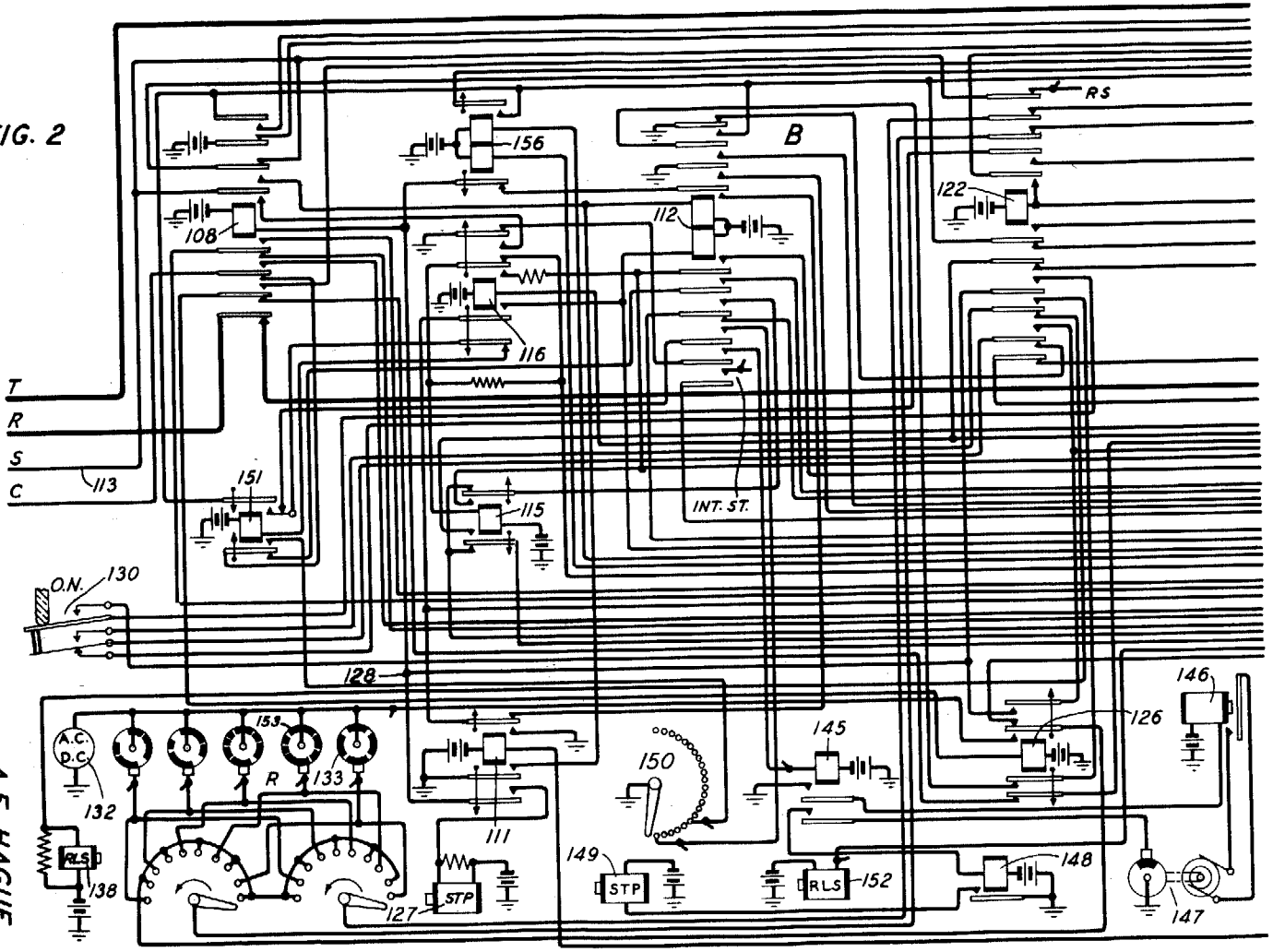
Figure 3:
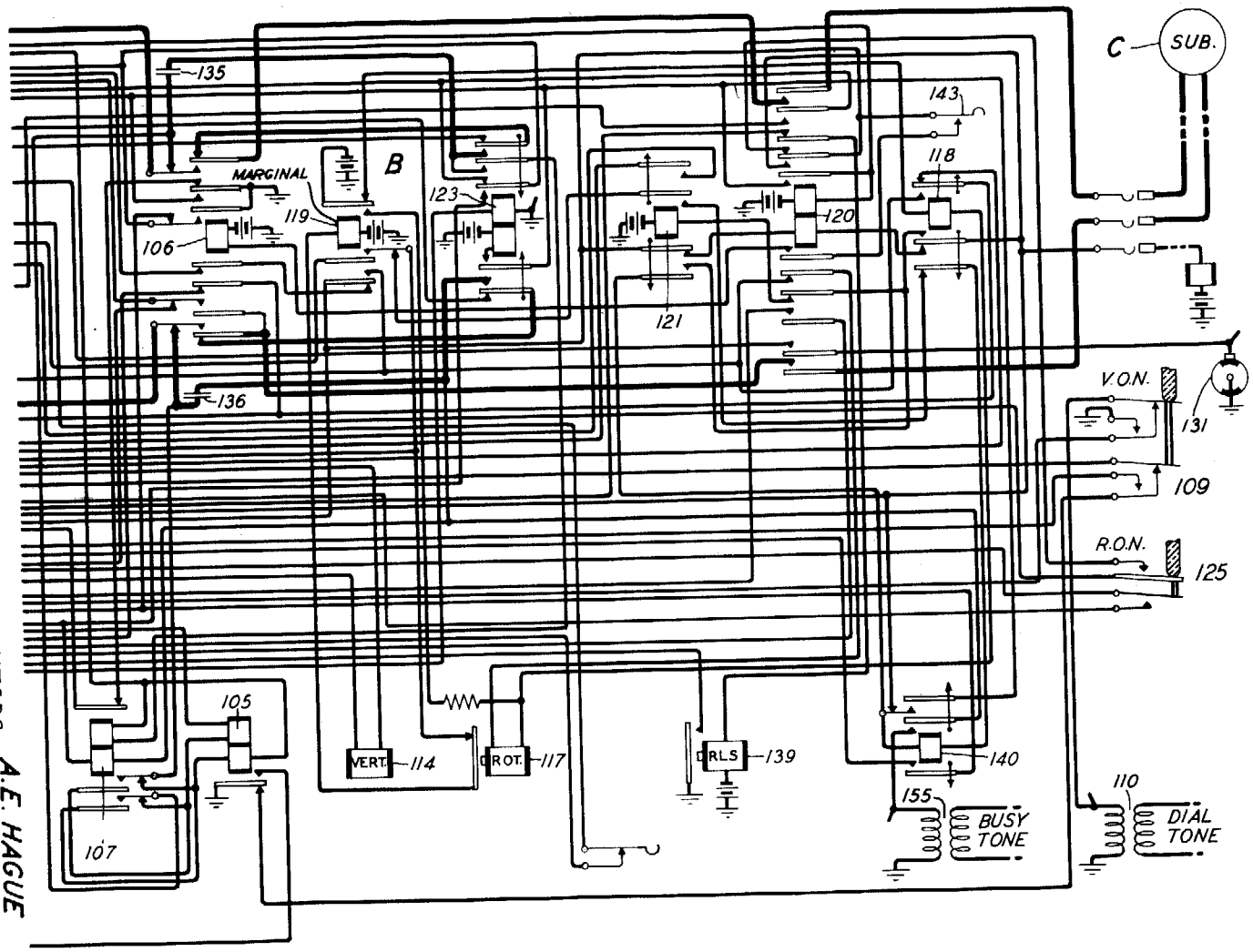

Referring now to the drawings, Figs. 1 to 3 may be connected as shown in Fig. 4. Fig. 1 shows a calling subscriber's line in an exchange and a line finder, the latter in diagrammatic form. Figs. 2 and 3 show a selector-connector circuit originating in the line finder shown in Fig. 1 and terminating in brushes which have access to a called subscriber's line in the exchange as shown in diagrammatic form.

To show the embodiments of the features of this invention in connection with these drawings, descriptions will be made of a call from a calling subscriber at "A", through the calling subscriber's line circuit, and the line finder LF, shown in Fig. 1, and the selector-connector "B" shown in Figs. 2 and 3 to a calling subscriber at "C", Fig. 3; followed by the operation of these circuits if the calling subscriber fails to dial within a certain time after the seizure of the selector-connector and if the subscriber fails to dial the complete number to establish the connection to the called subscriber, namely, the release of the line finder and the selector-connector under these circumstances. These descriptions in turn will be followed by descriptions of the operations of the circuits whereby the calling subscriber is prevented from seizing another line finder and establishing a connection until he has replaced the receiver on the switchhook, whereby, after the calling subscriber has hung up his receiver at the completion of the conversation with the called subscriber, all of the switches used in the connection are released, and whereby, if the called subscriber still has his receiver off the switchhook, his line will immediately seize a set of switches, and how all of these switches are released a certain time interval thereafter provided the called subscriber takes no further action within this interval towards the establishing of a new connection, and how this called subscriber is thereafter prevented from extending a connection until after his receiver is replaced on the switchhook.

Referring now to a call from the subscriber at "A" to the subscriber at "C" a circuit is completed when the calling subscriber removes his receiver from the switchhook to cause the operation of line relay 5 from battery, middle winding of this relay, lower inner armature and back contact of relay 6, through the calling subscriber's loop back over the upper inner armature and back contact of relay 6, lower winding of relay 5 to ground. Relay 5 in operating connects ground to the start lead 7 at its lower armature and front contact through contacts of relays 8 and 6 to start the line finder LF to connect its brushes with the terminals of this line circuit and thus connect the calling subscriber's line to the selector-connector "B". Relay 5 in operating also connects its upper winding from battery through contacts of relays 5 and 8 to the sleeve leads of the line finder. When the line finder has found the line this battery connection to the sleeve lead causes the line finder to stop on the terminals of the line. A ground on the sleeve brush in the line finder causes the operation of relay 6 from battery, winding of relay 6, contacts and upper winding of relay 5, contacts of relay 8 and the sleeve lead to ground. While the connections for the middle and lower windings of relay 5 from the calling subscriber's line are opened by the operation of relay 6, this relay 5 will be maintained operated through the circuit over its upper winding by the ground in the line finder until relay 6 has fully operated when relay 5 releases due to the shunting of the battery connection for relay 5 by the closing of the locking circuit for relay 6 at the upper outer armature and front contact of relay 6. Relay 6 in operating connects the tip and ring conductors from the calling subscriber's line to the tip and ring conductors of the line finder and the selector-connector. The ground connection on the sleeve will now be extended to the multiple sleeve connections terminating in selector-connectors as indicated at 10. This ground connection extends through the upper outer armatures and back contacts of relays 8 and 6 to make these multiple connections busy for incoming calls. The operation of relay 6 will open at this lower armature and back contact the connection to ground for the start lead 7.

On the operation of relay 6 the connection over the calling subscriber's loop extended over the tip and ring conductors through the selector-connector "B" causes a circuit to be completed for the operation of relay 105 through the calling subscriber's loop over these tip and ring conductors. The tip conductor is connected through contacts of relays 106 and 107, upper winding of relay 105, contacts of relay 108, vertical off-normal contacts 109 to ground, through one winding of the repeating coil 110, the other winding of which is connected to a dial tone source, and the ring conductor is connected through contacts of relays 108, 106 and 107, lower winding of relay 105, contacts of relay 108 to battery. Relay 105 in operating closes a circuit for relay 111. This relay in turn closes a circuit for relay 112 through the upper winding of relay 112 from ground at the lower inner armature and front contact. Relay 111 also applies a ground at the upper armature and front contact through contacts of relay 106 over the sleeve conductor 113 to the line finder LF to hold this switch operated. Relay 112 in operating prepares a pulsing path for the vertical magnet 114 and dial tone is in the meantime transmitted from the tone source through repeating coil 110 to the calling subscriber to indicate that the selector-connector B is ready for the reception of the first series of impulses.

At each interruption of the dial on the sending of the first digit impulses, relay 105 is released and operates the vertical magnet 114 in series with relay 115, this latter relay remaining operated during the sending of the first digit impulses. The pulsing circuit may be traced from battery through the winding of relay 115, contacts of relay 116, winding of vertical magnet 114, contacts of relay 112, vertical off-normal contacts 109 to ground at the armature and back contact of relay 105. After the first impulse, the vertical off-normal contacts 109 shift the pulsing circuit for the vertical magnet and relay 115 through the upper armature and front contact of relay 115 so that at the end of this series of impulses when relay 115 releases, the pulsing circuit may be shifted to the rotary magnet 117. The shifting of the vertical off-normal contacts 109 disconnects the dial tone from the calling subscriber's line. At the end of this series of impulses relay 115 releases and the brushes of the selector-connector have been advanced to the desired level in which a called subscriber's line is located. On the next digit or series of dial impulses, relay 105 releases and operates the rotary magnet 117 and relay 118 in series. This circuit may be traced from battery, contact of relay 119, winding of relay 118, winding of the rotary magnet 117, contacts of relays 120, 122 and 106, upper armature and back contact of relay 115, contacts of relay 112, vertical off-normal contacts 109 to ground at the armature and back contact of relay 105. When relay 118 operates this circuit is shifted through the upper armature and front contact of relay 118 independent of the connection through contacts of relay 122. Relay 118 remains operated during the pulsing due to its slow release characteristics.

It should be noted that on the first rotary step the rotary off-normal contacts 125 close a circuit for the operation of relay 122 from battery, winding of this relay, rotary off-normal contacts 125, contacts of relay 120, to ground at contacts of relay 112. Relay 122 closes a locking circuit for itself through its upper inner armature and front contact through contacts of relays 106 and 119 to ground at relay 112. Relay 122 in operating opens at its lower outer armature and back contact the original pulsing circuit for rotary magnet 117 which is shifted as hereinbefore stated to extend through contacts of relay 118.

At the end of the second series of impulses, the brushes of the selector-connector B will be in connection with the terminals of the desired subscriber's line. When this takes place and the line is idle, relay 118 releases and a circuit is thereby completed from battery over the usual cut-off relay in the line of the called subscriber over the sleeve connection through contacts of relay 118, lower winding of relay 120, contacts of relay 121 and contacts of relay 112 to ground. This circuit causes relay 120 to be partially operated to close a circuit through its upper inner armature and front contact from battery to ground at relay 112 to cause the relay 120 to be fully operated. Relay 120 in operating fully provides a ground for the sleeve circuit at its second upper armature and front contact from contacts of relay 112 directly to make the called subscriber's line busy. Relay 120 also prepares a ringing circuit for the tip and ring conductors to the called subscriber's line through the ringing trip relay 123 from a ringing source as hereinafter traced.

This selector-connector B is arranged for party line ringing, and it functions so that regardless of whether the called party is on a single line or on a party line the calling subscriber must operate a ringing code switch R to select a suitable ringing code. This, the subscriber will now proceed to do by sending a code selecting digit to relay 105. For a single line the code 1 is dialed so that relay 105 will release once. On the release of relay 105 at this time a circuit is completed for relay 126 and code switch stepping magnet 127 in parallel. The circuit for relay 126 extends from battery through the winding of this relay, contacts of relay 108 to a point 128 and the circuit for the stepping magnet 127 extends from battery through the winding of this magnet, contacts of relay 111 to point 128. From this point on the circuit may be traced through contacts of relay 122, code switch off-normal contacts 130, contacts of relay 122, upper armature and back contact of relay 118, contacts of relay 106, upper armature and back contact of relay 115, contacts of relay 112, vertical off-normal contacts 109 to ground at the armature and back contact of relay 105. Relay 126, in operating, locks itself over its upper outer armature and front contact to the ground at relay 105 independent of the off-normal contacts 130 and contacts of relay 122. Relay 126 being slow to release remains operated during the sending of the code and then releases. As this code comprises a single impulse, this relay will release when the impulse ceases. A circuit is also completed for the operation of relay 119 from battery, winding of relay 119, contacts of rotary magnet 117, contacts of relay 126, off-normal contacts 130, contacts of relays 122 and 120, contacts of code switch start interrupter 131 to ground. This circuit is closed when the interrupters of code switch R are in a position to permit a full code to be transmitted as is well known in the art. Relay 119 is locked under control of relay 122 to ground at relay 112 independent of interrupter 131. Relay 119 opens at its lower outer armature and back contact a locking circuit for relay 122 which now releases and closes a circuit for relay 116 from battery, winding of this relay, contacts of relays 122, 120, 108 and 106 to ground at relay 111. Relay 116 opens the circuits for the delayed release means to prevent it from functioning as hereinafter described. Relay 119 is in turn released on the release of relay 122.

This first impulse imparts a first step to the stepping magnet 127 which thereupon causes the brushes of the ringing code switch R to connect with the first terminal and thereby close the above mentioned ringing circuit through the windings of the ringing trip relay 123 for ringing of the called subscriber. The circuit may now be traced from the ringing current source 132 through the code interrupter 133, right-hand switch bank, first terminal, and brush of switch R, second upper armature and back contact of relay 122, lower outer armatures and back contacts of relays 123 and 106, lower outer armature and front contact of relay 120 to the ring conductor over the called subscriber's loop and the ringer in the subscriber's telephone set back over the tip conductor, through the upper outer armature and front contact of relay 120, upper outer armatures and back contacts of relays 106 and 123, third upper armature and back contact of relay 122, brush and the left-hand switch bank, first terminal, upper inner armature and back contact of relay 126, upper winding of relay 123 to ground. When the called subscriber C answers relay 123 is operated sufficiently over this circuit to close its locking winding which causes this relay to operate fully. The locking circuit may be traced from battery lower winding of relay 123 and lower inner armature and front contact to ground at contacts of relay 112. Relay 123 in operating closes at its upper and lower outer armatures and front contacts a tip and ring connection to the condensers 135 and 136 to complete the connection from the calling subscriber to the called subscriber.

This relay 123 also closes a circuit for relay 107 to cause it to operate and to close talking battery connections for the called subscriber's circuit. The talking battery for the called subscriber's line may be traced from battery through contacts of relay 108, upper winding of relay 107, contacts of relay 123, contacts of relays 106 and 120 through the tip conductor and the called subscriber's loop back over the ring conductor, contacts of relays 120, 106 and 123, through the lower winding of relay 107, contacts of relays 123 and 106 to ground at the upper armature and front contacts of relay 111. Relay 107 in operating reverses at the lower armatures and front contacts the connections through relay 105 for the calling subscriber's talking battery supply at contacts of relay 108 and ground at vertical off-normal contacts of relay 109. The talking circuits for the calling and called subscribers are now completed through the condensers 135 and 136, talking battery for both subscribers being furnished from the same source, at the third upper armature and back contact of relay 108, ground for relay 105 being supplied at the vertical off-normal contacts 109 and ground for relay 107 being supplied at the upper armature and front contact of relay 111.

When the calling subscriber disconnects, relays 105, 111 and 112 are released in the order named. The locking circuit for relays 123 and 120 are opened by the release of relay 112 causing these relays to release. The release of relay 112 also restores the code switch R by energizing its release magnet 138 over a circuit closed through the off-normal contacts 130 and the upper outer armature and back contact of relay 112 to ground, this circuit being opened when the code switch returns to normal at the off-normal contact 130. The release of relay 120 removes the ground connection from the sleeve of the called subscriber's line and opens the tip and ring connection thus releasing relay 107. Relay 120 also causes the energization of the release magnet 139 of the selector-connector B by closing a circuit for this magnet through its third upper armature and back contact to contacts of relay 112, vertical off-normal contacts 109 and the ground at the armature and back contact of relay 105. This circuit is opened at the vertical off-normal contacts when the selector-connector has returned to normal. Relay 111 in releasing removes the ground from the sleeve connection through the line finder thereby causing this line finder to release and this in turn causes the release of relay 6 in the line circuit of the calling subscriber's line to return the line circuit to normal.

In order to release the selector-connector and the line finder in case the calling subscriber fails to dial after he has removed the receiver from the hook and the selector-connector B has been seized, an arrangement is provided for causing this release after a certain interval. It will be noted that when relay 112 operates after the seizure of the selector-connector as hereinbefore described, a circuit will be completed for the operation of relay 145 from battery through the winding of this relay, the fifth lower armature and front contact of relay 112 and the upper outer armature and back contact of relay 116 to ground. This relay in turn causes an obvious circuit to be closed for the operation of relay 146. Relay 146 in operating closes a motor circuit that controls an interrupter as shown at 147. This interrupter in turn will alternately open and close the circuit for the alternate operation and release of relay 148. This controls the stepping circuit for the stepping magnet 149 which controls the switch bank 150 to cause the brush thereof to step over its terminals. After the first step a circuit is closed by the brush of this switch bank 150 from ground through the first terminal to close a circuit for the operation of relay 151 from battery, winding of this relay, lower outer armature and back contact of relay 116, upper make-before-break contacts of relay 151, fourth lower armature and front contact of relay 112, the first terminal and brush of bank 150 to ground. Relay 151 operates and closes a locking circuit for itself from battery through its winding, contacts of relay 116, its upper armature and front contact to ground at the upper armature and front contact of relay 112. Now, if the calling subscriber fails to dial within a certain interval, that is, the time it takes the brush of bank 150 to travel from the first terminal to the seventh terminal, a circuit will be completed from the ground on this brush and the seventh terminal for the operation of relay 8 in the calling subscriber's line circuit. The circuit for this relay may be traced from battery through the lower winding of relay 8 over the C terminal and brush of the line finder, the second lower armature and back contact of relay 108, the lower armature and front contact of relay 151, through the seventh terminal and brush of bank 150 to ground. Relay 8 in operating closes a locking circuit for itself under control of relay 5 which will operate as hereinafter described. Ground is connected to the sleeve leads of the multiple connections to selector-connectors to make the line busy and relay 8 opens the locking circuit for relay 6. The release of relay 6 disconnects the tip and ring conductors from the line finder circuits and thereby causes the release of the selector-connector in the manner hereinbefore described when the calling subscriber hangs up his receiver. The relay 6 in releasing also connects the tip and ring conductors to the upper and lower windings of relay 5 causing this relay to operate to close the locking circuit for relay 8. The calling subscriber will now be unable to extend the connection through another selector-connector until he has replaced the receiver on the switchhook and again removed it to seize another line finder and selector-connector. When the selector-connector releases the released magnet 139 in operating closes a circuit for the release magnet 152 of the switch 150 to cause it to return to normal. It will be noted that when relay 112 releases relays 145, 146, the interrupter 147, relay 148 and stepping magnet 149 are deprived of their operating circuits.

From the foregoing it follows that if the calling subscriber does not complete the dialing of the desired subscriber's number, the delay release means will operate after the fixed interval to release the connections.

It is evident if the selector-connector is released and the called subscriber still has his receiver off the switchhook this will cause his line to seize a line finder and selector-connector but as he will fail to take any further action the delayed release means will operate to disable his line in the same manner as the calling subscriber's line was disabled on the failure to dial.

This system is also arranged for revertive calls, that is, calls between parties on the same line. If the subscriber of a party line decides to make a revertive call, the operation of the system is the same as in the case of a call from a subscriber of a single line such as the subscriber at A up to the point where the selector-connector B finds the terminals of the called line, which in this case would be the same party line over which the call originated. Since relay 6 of this line is already held busy by the line finder LF, a regular busy condition including a busy tone is set up.

This busy condition is identified by the ground on the sleeve terminal of the calling line. Under these circumstances the test relay 121 operates before relay 118 releases over a circuit from battery, winding of relay 121, contacts of relays 120 and 118 to ground over the sleeve terminal from the line finder employed. Relay 121 locks to this ground over its own lower outer armature and front contact and make-before-break contacts of relays 140 independent of relay 118. When now relay 118 releases, a circuit is closed from battery, winding of relay 119, contacts of rotary magnet 117, make-before-break contacts of relay 119, contacts of relays 121 and 118, winding and make-before-break contacts of relay 140 to ground on the sleeve terminal of the called line. Relay 119 is marginal and does not operate, but relay 140 operates in this circuit. Relay 140 operating provides a locking circuit for itself and the relay 121 through its upper outer armature and front contact to ground at contacts of relay 112. Relay 140 connects the left-hand winding of the busy tone coil 155, to one side of the condenser 136, thereby causing a busy tone to be transmitted through this connection and through contacts of relays 106 and 108 to the calling line.

The calling subscriber now dials the ringing code of the desired party in the same manner as a regular call and the code switch R accordingly causes the code to be transmitted out over the terminals of the party line from the selected interrupter in the usual manner as hereinbefore described and the calling party then replaces his receiver on the switchhook. This causes relay 105 to release to provide a ground connection to the sleeve terminal of the called line. This circuit may be traced as follows: ground through contacts of relay 105, vertical off-normal contacts 109, contacts of relays 112, 115, 106, 118, 122, off-normal contacts 130, contacts of relays 122, 126, 112, sleeve brush and terminal of the called line . Relay 111 then releases and removes the ground from the sleeve terminals to the line finder LF but the ground over the sleeve terminal through the selector-connector from relay 105 extends to the sleeve circuit at 10 and serves as a substitute ground to hold the line finder and the selector-connector engaged. This ground on the sleeve to the line finder causes the operation of relay 108 from battery, winding of relay 108, contacts of relays 156, 112, 111, 106 to ground at the contacts of relay 105 over the sleeve as hereinbefore traced. Relay 108 in operating opens the ring connection towards the line finder and closes a circuit for relay 120 from battery, upper winding of relay 120, contacts of relays 108, 112, to ground, and relay 120 locks directly to the ground at relay 112. A circuit is closed to ground at relay 116 for the sleeve through contacts of relay 108 to hold the line finder and connector momentarily operated after ringing is tripped. Another circuit is also closed by relay 108 to hold relay 112 operated from battery, upper winding of relay 112, contacts of relays 108 and 123 to ground on the sleeve. Relay 120 in operating closes the tip and ring conductors through to the ringing relay 123 from the called party line and prepares for the transmission of the ringing code by closing the circuit for the momentary operation of relay 119 from the code switch starting interrupter 131 as hereinbefore described to operate relay 116 and release relay 122. The ringing of the called subscriber now takes place as in any other connection for calling a single party line, as hereinbefore described. In this case the code signals may, for example, consist of three impulses from the source 132 controlled by the interrupter 153, with the circuits being otherwise the same as hereinbefore traced for a single party code controlled by interrupter 153. The only exception is that in this case when the called party code is rung out over one side of the line, there are two short ringing impulses transmitted during the silent intervals over the other side of the line. The termination of ringing by these two short ringing impulses when the called subscriber answers informs the calling subscriber when to come in on the connection in case the calling subscriber's ringer is located on the opposite side of the line from the called subscriber's ringer. These two short ringing impulses are transmitted under control of relay 126, the circuit for which has been transferred by the operation of relay 108 to the impulse lead RS on which a ground momentarily operates this relay twice during the silent intervals. This relay 126 thus causes ringing current from source 132 to be supplied during each silent interval to the tip or ring conductor, depending on the code transmitted. For example, if the code is applied as stated through interrupter 153, it is applied over the ring conductor and the two short impulses are therefore applied over the tip conductor from this source 132, through the upper inner armature and front contact of relay 126, third contact and brush of the left-hand bank of the switch R, contacts of relays 122, 123, 106 and 120 to the tip conductor. These two short impulses will operate all the bells on the tip side of the line so that if the calling subscriber's ringer is located on this side, he will know when to answer the call. When the called subscriber answers, the ringing trip relay 123 is operated as usual. In this case, however, due to the operation of relay 108, the ground on the sleeve will be connected over the C terminal and brush of the line finder for the operation of relay 8 from battery, lower winding of relay 8, the C terminal and the brush of the line finder LF, contacts of relays 108 and 123 to ground at the sleeve from contacts of relay 105. Relay 8 in operating opens the locking circuit for the cut-off relay 6 and as the calling or called subscribers, or both, have their receivers off the switchhooks, relay 5 will operate and hold relay 8 operated. The connections through the line finder LF and the selector-connector B are therefore, due to the release of relay 6, opened and these switches are released in the usual manner as in the case when a calling subscriber fails to dial within a certain interval as hereinbefore described. Talking battery is now applied through the windings of relay 5 and contacts of relay 6. The connection will be released when the subscribers on this line replace their receivers on the switchhook to release relay 5. If the called subscriber fails to answer the call, the calling subscriber must momentarily remove his receiver from the switchhook in order to release the connection. This will operate the ringing trip relay 123 and release will take place as usual.

What is claimed is:

1. In a telephone system, a calling line, a called line, sets of switches, means for establishing a connection between said calling line and said called line over a set of switches, means responsive to the calling subscriber replacing his receiver on the switchhook for disconnecting said lines and releasing said switches, means thereafter responsive due to the called subscriber still having his receiver off the switchhook for seizing a set of switches, and means responsive at a predetermined time thereafter if the called subscriber fails to take any further action for releasing said set of switches.

2. In a telephone system, a calling line, a called line, sets of switches, means for establishing a connection between said calling line and said called line over a set of switches, means responsive to the calling subscriber replacing his receiver on the switchhook and for disconnecting said lines and releasing said switches, means thereafter responsive due to the called subscriber still having his receiver off the switchhook for seizing a set of switches, and means responsive at a predetermined time thereafter if the called subscriber fails to take any further action for releasing said set of switches and for preventing said called line from reseizing another set of switches until the called subscriber has replaced his receiver on the switchhook.

3. In a telephone system, a calling line, a called line, sets of switches accessible to said lines for establishing a connection between them, means responsive to the calling subscriber removing his receiver from the switchhook for causing a switch of an idle set to be operated to connect the calling line with said set, means responsive to impulses from the calling subscriber's line for operating switches in the connected set to complete a connection between said lines, a relay associated with the calling line, a timing device common to said sets of switches, means for actuating said timing device when a set of switches is connected to the calling line, means for actuating said relay by said timing device after it has been operated a certain period provided the connection between the two lines has not been completed, means controlled by said relay if operated for releasing actuated switches and for preventing the calling line from being again connected to an idle set of switches as long as the receiver of the calling line remains off the switchhook.

4. In a telephone system, a calling line, sets of switches accessible to said line for establishing connections, means responsive to the calling subscriber removing his receiver from the switchhook for causing a switch of an idle set of switches to be operated to connect the calling line with said set, a relay associated with said line, a timing device common to said sets of switches, means for actuating said timing device when a set of switches is connected to the calling line, a second relay, means for operating said second relay when said timing device is actuated, means operative a certain interval after the actuation of the timing device and in response to the operation of said second relay for actuating said first relay, a third relay, means for actuating said third relay over the calling subscriber's line loop and for releasing said actuated switch in response to the actuation of said first relay, and means controlled by said third relay for maintaining said first relay operated as long as the calling subscriber's line loop is maintained.

5. In a telephone system, a calling line, sets of switches each comprising a line finder and a selector, means responsive to the calling subscriber removing his receiver from the switchhook for actuating the line finder of an idle set for associating the calling line terminals with the associated selector, a holding circuit for said line finder closed when said line terminals are associated with said selector, a relay operating through said holding circuit when closed for connecting the calling line conductors with said line terminals to said selector, a timing device common to said sets of switches, means for starting the operation of said timing device when the calling line is extended to said selector, a second relay, means for actuating said second relay by said timing device after it has been operated a certain period provided no impulses have been sent over the calling line to actuate the selector within said period, means operative on the actuation of said second relay for releasing said first relay to disconnect the calling line from its line terminals and for returning said line finder to normal.

6. In a telephone system, a calling subscriber's line, a called subscriber's line, sets of switches each comprising a line finder and a selector, means responsive to the calling subscriber removing his receiver from the switchhook for actuating the line finder of an idle set for associating the calling line terminals with the associated selector, a holding circuit for said line finder closed when said line terminals are associated with said selector, a relay operative through said holding circuit when closed for connecting the calling line conductors with said line terminals to said selector, means for actuating said selector over the calling line conductors to extend the calling line conductors to said called subscriber's line, a timing device common to said sets of switches, means for starting the operation of said timing device when the calling line is extended to said selector, a second relay, means for actuating said second relay by said timing device after it has been operated a certain period provided said selector has not been actuated to complete the connection to the called subscriber's line within said period, means operated on the actuation of said second relay for releasing said first relay to disconnect the calling line from its line terminals and for returning said line finder and selector to normal.

7. In a telephone system, a calling line, a called line, sets of switches, means for establishing a connection between said calling line and said called line over a set of switches, means responsive to the calling subscriber replacing his receiver on the switchhook for disconnecting said lines and releasing said switches, means thereafter responsive due to the called subscriber still having his receiver off the switchhook for causing a switch of an idle set of switches to operate to connect said called line with an idle set of switches, and means responsive at a predetermined time after the connection of the called line to said switch for disconnecting it and restoring it to normal if the called subscriber fails to take any action towards the establishing of a connection through said appropriated set of switches.

8. In a telephone system, a calling line, a called line, sets of switches, means for establishing a connection between said lines over a set of switches, means responsive to the calling subscriber replacing his receiver on the switchhook for disconnecting said lines, means thereafter responsive to the called subscriber's receiver being off the switchhook for causing a switch of an idle set of switches to be operated to connect the called line with said set, a relay associated with said called line, a timing device common to said sets of switches, means for actuating said timing device as soon as the called line is connected to a set of switches, means for actuating said relay by said timing device after it has been operated a certain period, and means controlled by said relay when operated for releasing the said actuated switch to normal for preventing the called line from being again connected to an idle set of switches as long as the receiver of said called line remains off the hook.

9. In a telephone system a calling line, a called line, sets of switches accessible to said lines for establishing a connection between them, means responsive to the calling subscriber removing his receiver from the switchhook for causing a switch of an idle set to be operated to connect the calling line with said set, means responsive to impulses from the calling subscriber's line for operating switches in the connected set to complete a connection between said lines, a relay associated with the calling line, a timing device common to said sets of switches, means for actuating said timing device when a set of switches is connected to the calling line, means for actuating said relay by said timing device after it has been operated a certain period if no impulses have been received from the calling line for completing the connections between the two lines, means controlled by said relay if operated for releasing the switch connected to the calling line and for preventing the calling line from being again connected to an idle set of switches as long as the receiver of the calling line remains off the switchhook.

10. In a telephone system, a calling line, a called line, sets of switches accessible to said lines for establishing a connection between them, means responsive to said calling subscriber removing his receiver from the switchhook for causing a switch of an idle set to be operated to connect the calling line with said set, means responsive to impulses from the calling subscriber's line for operating switches in the connected set to complete a connection between said lines, a relay associated with the calling line, a timing device common to said sets of switches, means for actuating said timing device when a set of switches is connected to the calling line, means for actuating said relay by said timing switch after it has been operated a certain period if impulses have been received from the calling line but not sufficient for the completion of a connection between the two lines, and means controlled by said relay if operated for releasing actuated switches and for preventing the calling line from being again connected to an idle set of switches as long as the receiver of the calling line remains off the switchhook.

ALFRED E. HAGUE.
JOHN B. DRAPER.